(12) United States Patent
Kai

(10) Patent No.: US 11,475,872 B2
(45) Date of Patent: Oct. 18, 2022

(54) SEMICONDUCTOR DEVICE

(71) Applicant: LAPIS Semiconductor Co., Ltd., Yokohama (JP)

(72) Inventor: Atsuhiro Kai, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/936,546

(22) Filed: Jul. 23, 2020

(65) Prior Publication Data
US 2021/0035548 A1 Feb. 4, 2021

(30) Foreign Application Priority Data

Jul. 30, 2019 (JP) .............................. JP2019-140350
Mar. 31, 2020 (JP) .............................. JP2020-063933

(51) Int. Cl.
*G10K 15/04* (2006.01)

(52) U.S. Cl.
CPC .................................. *G10K 15/04* (2013.01)

(58) Field of Classification Search
CPC .. G10K 15/04; H04N 21/4305; H04N 21/432; H04N 21/4398; G11B 27/10; G11B 20/10222; G11B 20/10481; H04S 3/008
See application file for complete search history.

(56) References Cited

U.S. PATENT DOCUMENTS

| | | | | |
|---|---|---|---|---|
| 5,926,606 | A * | 7/1999 | Wang | G11B 20/1403 386/204 |
| 7,877,156 | B2 * | 1/2011 | Fujimoto | G11B 27/10 700/94 |
| 2009/0055005 | A1 * | 2/2009 | Oxman | G10L 19/16 700/94 |
| 2009/0182555 | A1 * | 7/2009 | Chang | G10L 21/0364 704/201 |

FOREIGN PATENT DOCUMENTS

JP 2007-235526 A 9/2007

OTHER PUBLICATIONS

Applicant's Admitted Prior Art (AAPA; from Applicant's Background Section of Specification, ¶002-¶005 with Figs 1-6 (Year: 2019).*

* cited by examiner

*Primary Examiner* — Quan Zhen Wang
*Assistant Examiner* — Mancil Littlejohn, Jr.
(74) *Attorney, Agent, or Firm* — Rabin & Berdo, P.C.

(57) ABSTRACT

There is provided a semiconductor device having a timing generator that generates synchronization signals so as to match input timings of serial audio data input from an external source, a reproduction processor that, based on the synchronization signals, reads audio data from memory, performs reproduction processing, and outputs a plurality of channel information items, and a mixer that mixes the plurality of channel information items with the serial audio data, and reproduces an audio signal.

5 Claims, 9 Drawing Sheets

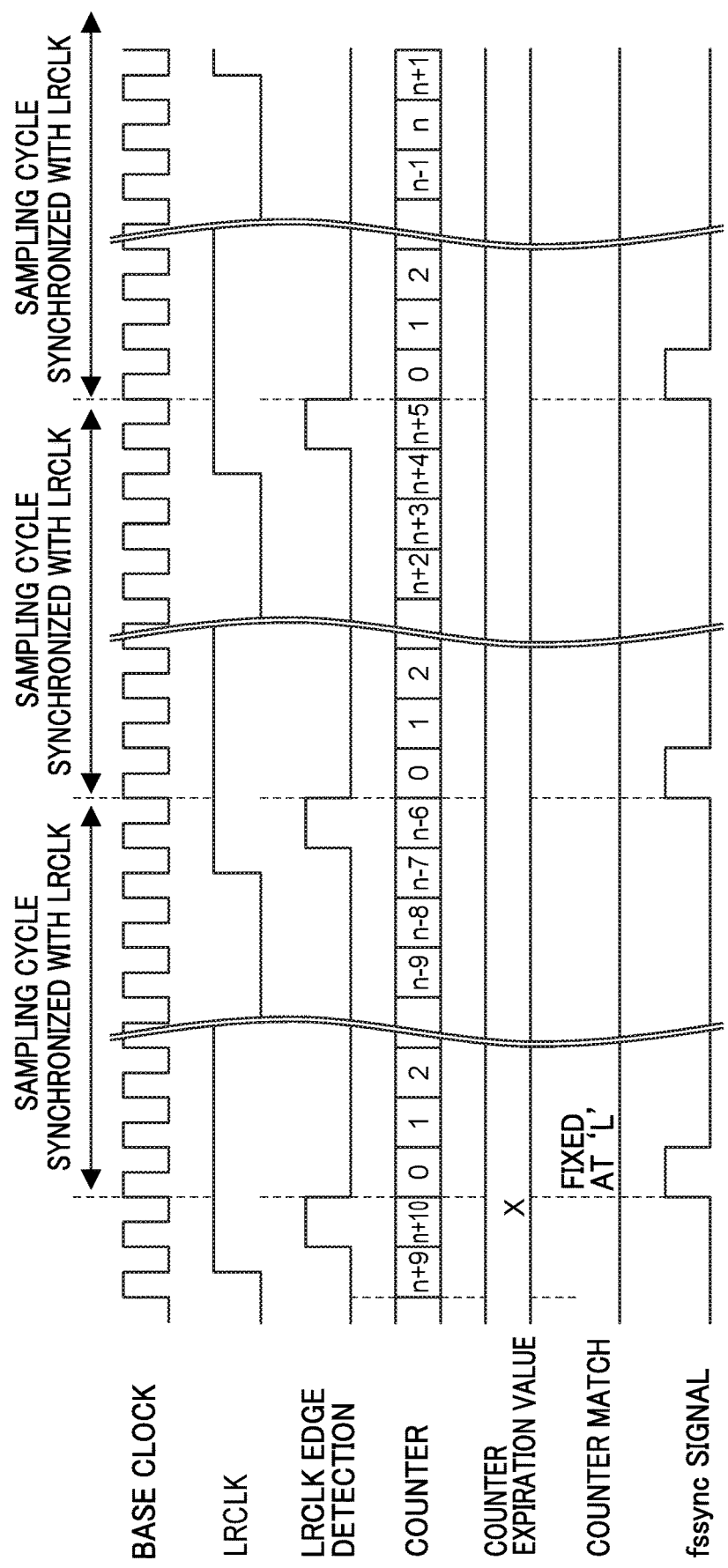

SEMICONDUCTOR DEVICE

CROSS-REFERENCE TO RELATED APPLICATION

This application is based on and claims priority under 35 USC 119 from Japanese Patent Application No. 2019-140350 filed on Jul. 30, 2019 and Japanese Patent Application No. 2020-063933 filed on Mar. 31, 2020, the disclosures of which are incorporated by reference herein.

BACKGROUND

Technical Field

The present disclosure relates to a semiconductor device that reads and then reproduces audio data from memory built into an LSI (Large Scale Integration) or from memory that is external of the LSI, in which the audio data is mixed with serial audio input data that is input from an external source such as an I2S (Inter-IC Sound) bus.

Related Art

FIG. 1 shows an example of the structure of a semiconductor device 100 that outputs audio signals. As is shown in FIG. 1, the semiconductor device 100 is formed by a timing generator 110, a reproduction processor (decoder) 120, a mixer 130, and memory 140. The timing generator 110 generates a sampling cycle by causing a counter to operate using an internal base clock of the semiconductor device 100. For example, as is shown in FIG. 2, the timing generator 110 counts a base clock after setting an arbitrary counter expiration value n, and outputs a counter match signal using the $n^{th}$ rise of the base clock so as to generate a signal (fssync) that is in synchronization with the cycle thereof. As is shown in FIG. 3, operations of the semiconductor device 100 include: (1) the timing generator 110 generating the fssync signal; (2) the reproduction processor (decoder) 120 performing time-division on a reproduction channel using this fssync signal as a trigger and reading audio data from the memory 140; (3) the reproduction processor (decoder) 120 then decoding the read audio data; and (4) the mixer 130 performing the final mixing of the decoded audio data and then outputting the result.

When the semiconductor device 100 mixes audio data read from memory with serial audio data from an I2S or the like, as is shown in FIG. 4, the four channels used for the reading from the memory 140 and the reproduction processing are reduced to two channels, so that the audio reproduction based on reading from the memory is performed using two channels, and two channels (L ch and R ch) are used for the serial audio data, thereby giving a total of four channels that are employed for the mixing processing.

Moreover, Japanese Unexamined Patent Application (JP-A) No. 2007-235526 (Patent Document 1) discloses a clock generating device that adjusts a BCLK which is generated based on the system clock so that this is synchronized to the rising or falling edge of an LRCLK.

However, if an attempt is made to perform mixing reproduction using serial audio data input using I2S or the like, and audio data read from the memory, then if a divergence is generated between the sampling cycle of the serial audio input and the sampling cycle internally generated in the LSI, there is a deterioration in the sound quality of the reproduced audio due to duplicated imports of the serial audio inputs as well as missed imports thereof.

SUMMARY

The present disclosure was conceived in view of the above-described circumstances and it is an object thereof to provide a semiconductor device that, when audio data read from memory is mixed with serial audio data, inhibits duplicated imports of the serial audio data as well as missed imports thereof, and enables an improvement in the sound quality of the reproduced audio to be achieved.

A semiconductor device according to a first aspect of the present disclosure includes a timing generator that generates synchronization signals so as to match input timings of serial audio data input from an external source, a reproduction processor that, based on the synchronization signals, reads audio data from memory, performs reproduction processing, and outputs a plurality of channel information items, and a mixer that mixes the plurality of channel information items with the serial audio data, and reproduces an audio signal.

A semiconductor device according to a second aspect of the present aspect disclosure is characterized in that, in the semiconductor device according to the first aspect, the timing generator detects rises or falls of a channel switching clock in the serial audio data, and generates the synchronization signals in accordance with these detections.

A semiconductor device according to a third aspect of the present aspect disclosure is characterized in that, in the semiconductor device according to the first aspect, at the timings when the rises or falls of the channel switching clock in the serial audio data are detected, the timing generator holds a value of a counter whose value is increased by the base clock as a counter expiration value, and generates the synchronization signals at timings when the value of the counter matches the counter expiration value.

A semiconductor device according to a fourth aspect of the present aspect disclosure is characterized in that, in the semiconductor device according to the third aspect, the timing generator updates the counter expiration value at a predetermined cycle.

According to the present disclosure, it is possible to provide a semiconductor device that, when audio data read from memory is mixed with serial audio data, generates synchronization signals that match the input timings of the serial audio data, and thereby makes it possible to inhibit duplicated imports of the serial audio inputs as well as missed imports thereof, and to enable an improvement in the sound quality of the reproduced audio to be achieved.

BRIEF DESCRIPTION OF THE DRAWINGS

Exemplary embodiments of the present disclosure will be described in detail based on the following figures, wherein:

FIG. 9 is a timing chart for the semiconductor device 200 according to an exemplary embodiment of the present disclosure.

DETAILED DESCRIPTION

Figure 1:
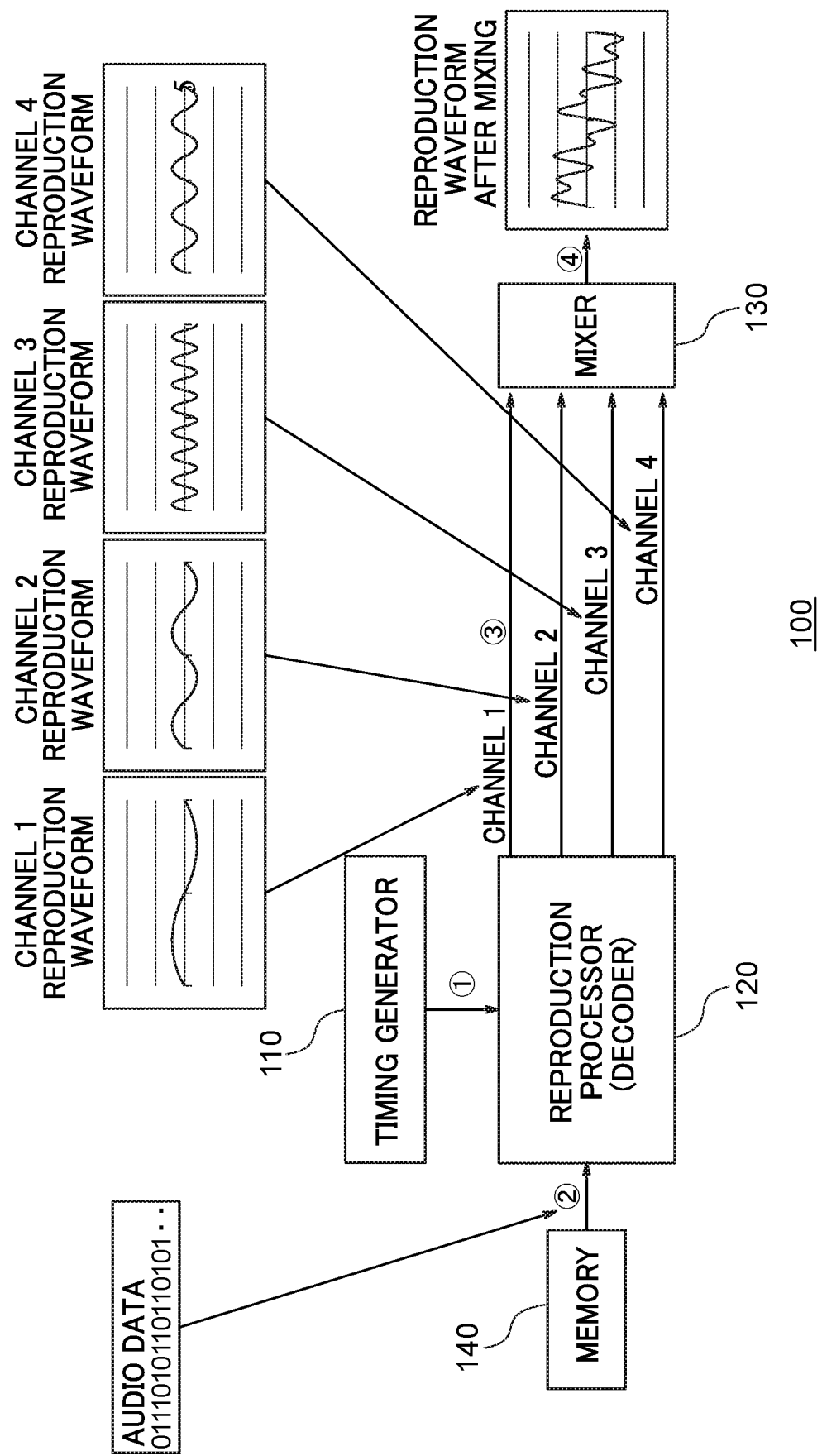
FIG. 1 is a structural block diagram of a semiconductor device 100 according to the conventional technology.
Figure 2:
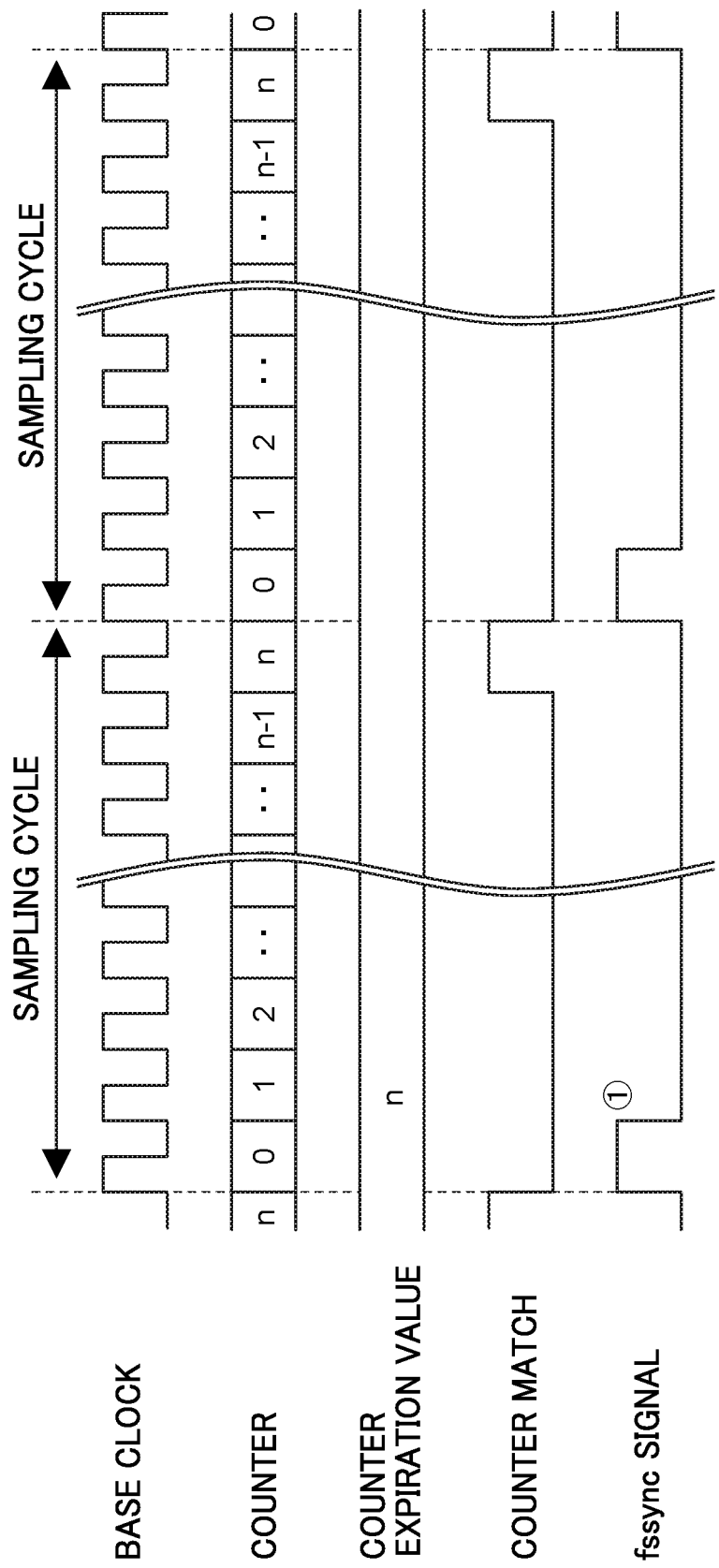
FIG. 2 is a timing chart for fssync signal generation according to the conventional technology.
Figure 3:
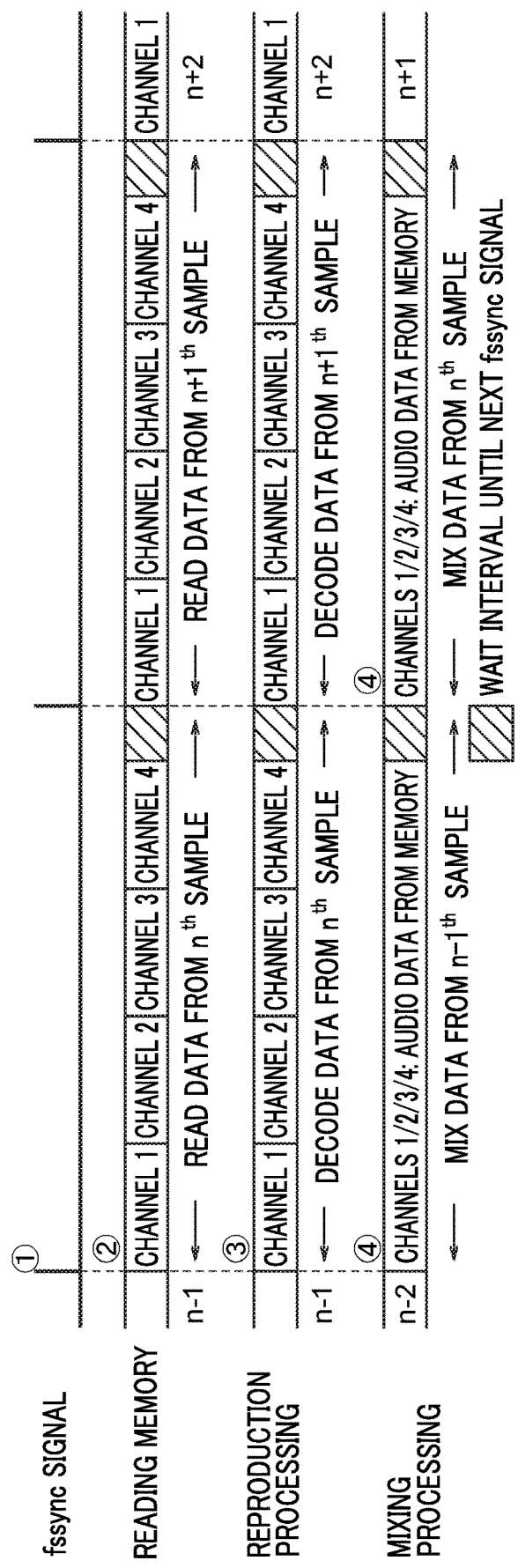
FIG. 3 is a timing chart for the semiconductor device 100 according to the conventional technology.
Figure 4:
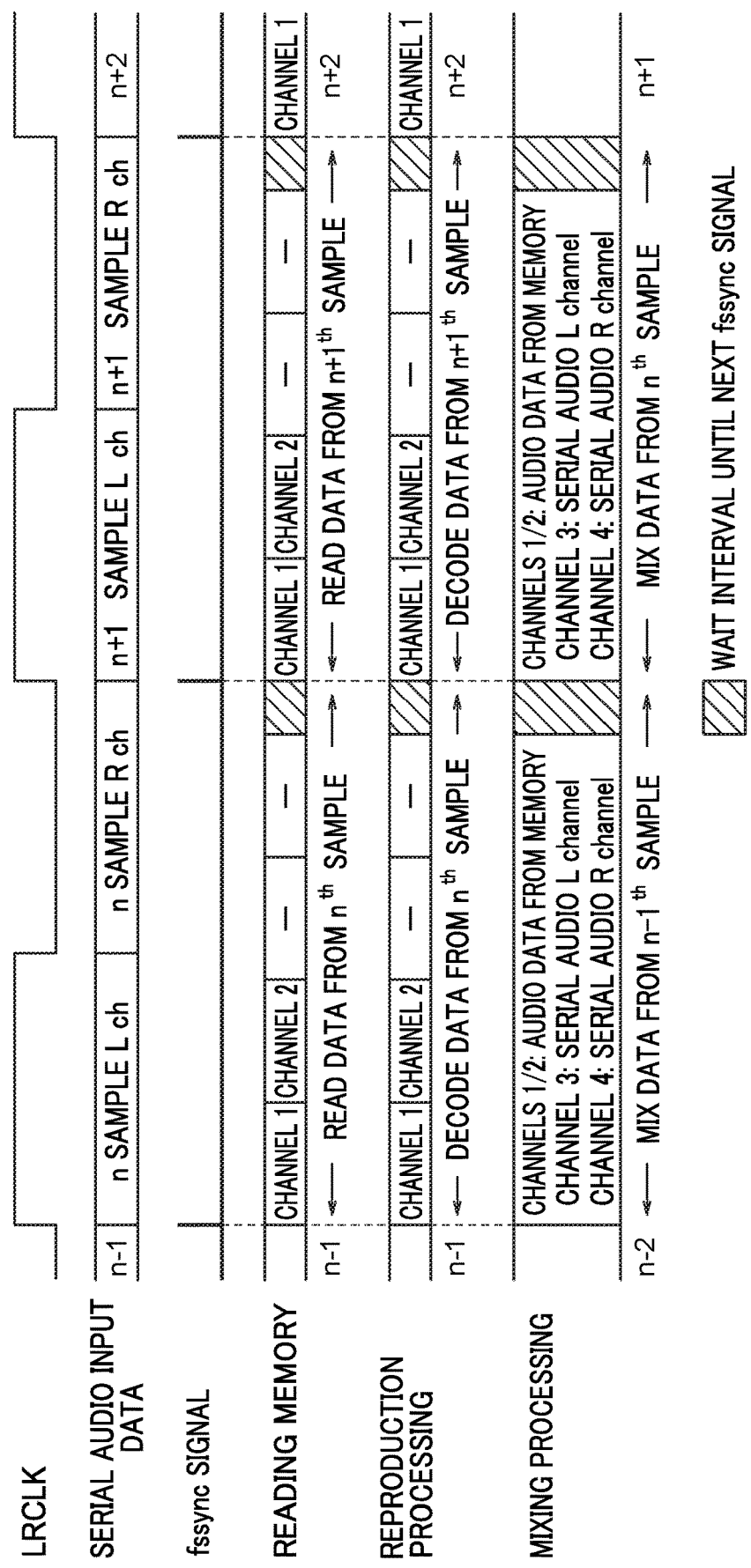
FIG. 4 is a timing chart for the semiconductor device 100 according to the conventional technology.

Hereinafter, an example of an exemplary embodiment of the present disclosure will be described with reference to the drawings. Note that component elements and portions that are mutually the same or equivalent in the respective drawings are given the same descriptive symbol. In addition, dimensional proportions in the drawings may be exaggerated in order to simplify the description, and may differ from actual proportions.

Firstly, a description will be given of a reason why, when serial audio data input from an external source using I2S or the like, and audio data read from internal memory are mixed and reproduced, a divergence is generated between a sampling cycle of the serial audio inputs and a sampling cycle internally generated in an LSI.

Figure 5:
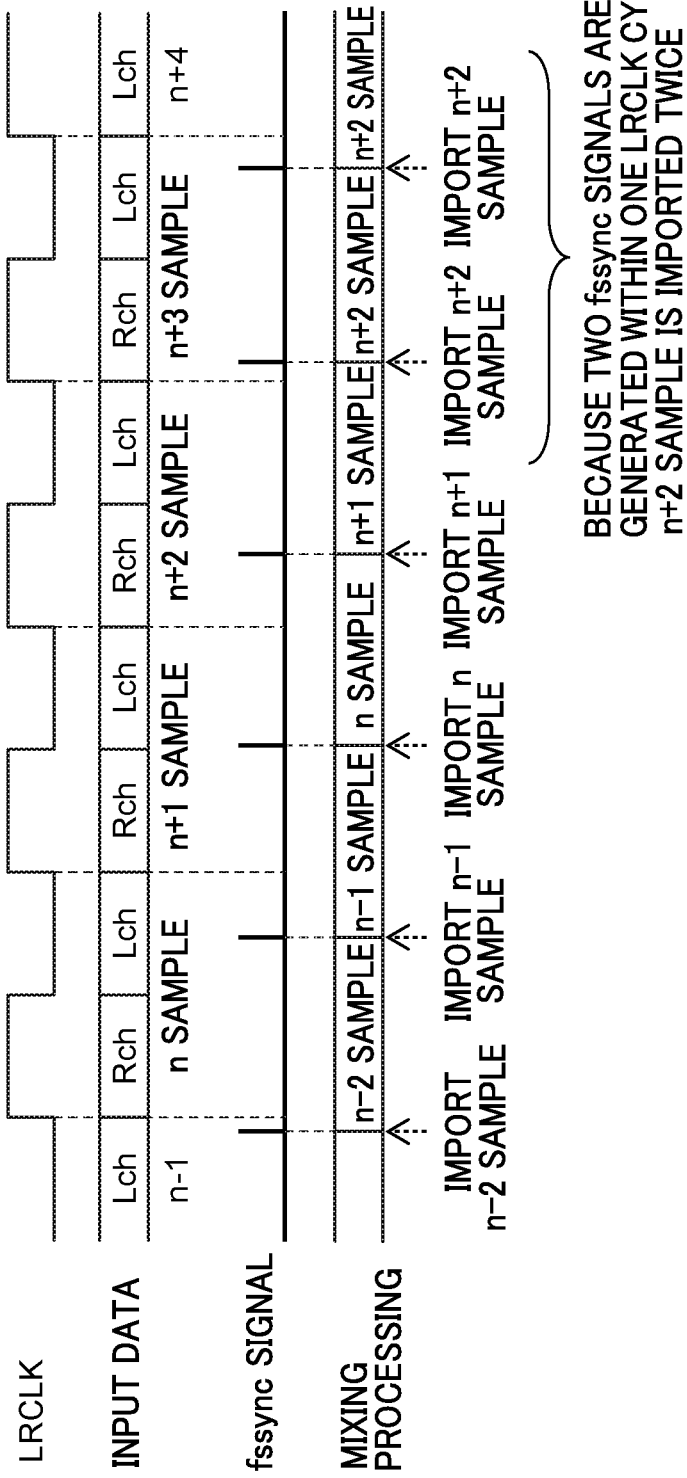
FIG. 5 is a view illustrating the semiconductor device 100 according to the conventional technology.

FIG. 5 is a timing chart illustrating a mixing and reproduction of serial audio data input from an external source and audio data read from internal memory. LRCLK is a clock that is used to switch the channel of the serial audio data. The example in FIG. 5 shows a case in which the serial audio data cycle (i.e., the LRCLK cycle) is longer than the cycle of the fssync signal that is generated based on the internal base clock in the semiconductor device.

If the LRCLK cycle is longer than the fssync signal cycle, the timings of the rises of the LRCLK cycle pulses gradually diverge from the timings of the rises of the fssync signal, and there may be instances when the fssync signal rises twice within one LRCLK cycle. In the example shown in FIG. 5, the fssync signal rises twice within one LRCLK cycle in the $n+3^{th}$ sample of the serial audio data.

If, in this way, the fssync signal rises twice within one LRCLK cycle, then a duplicated import of a sample of the serial audio data is generated. In the example shown in FIG. 5, in the $n+3^{th}$ sample of the serial audio data, because the fssync signal rises twice within one LRCLK cycle, the semiconductor device ends up importing the immediately previous $n+2^{th}$ sample of the serial audio data twice. This is known as a duplicated import of a sample. For this reason, a deterioration in the sound quality occurs when the LRCLK cycle is longer than the fssync signal cycle.

Figure 6:
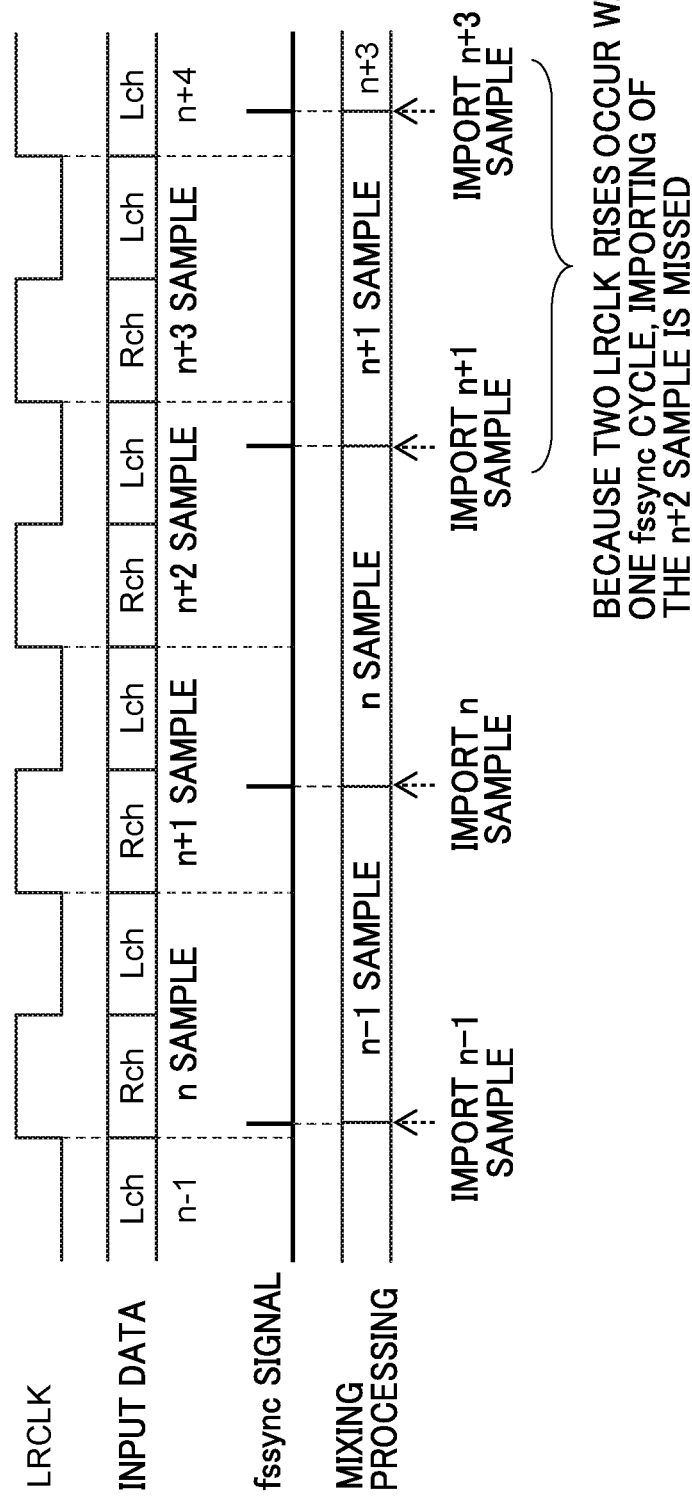
FIG. 6 is a view illustrating the semiconductor device 100 according to the conventional technology.

FIG. 6 is a timing chart illustrating the mixing and reproduction of serial audio data and audio data read from memory. The example in FIG. 6 shows a case in which the serial audio data cycle (i.e., the LRCLK cycle) is shorter than the cycle of the fssync signal that is generated based on the internal base clock in the semiconductor device.

If the LRCLK cycle is shorter than the fssync signal cycle, the timings of the rises of the LRCLK cycle pulses gradually diverge from the timings of the rises of the fssync signal, and there may be instances when the fssync signal does not rise at all within one LRCLK cycle. In the example shown in FIG. 6, the fssync signal does not rise at all within one LRCLK cycle in the $n+3^{th}$ sample of the serial audio data.

If, in this way, the fssync signal does not rise at all within one LRCLK cycle, then a missed import of a sample of the serial audio data is generated. In the example shown in FIG. 6, in the $n+3^{th}$ sample of the serial audio data, because the fssync signal does not rise at all within one LRCLK cycle, the semiconductor device is unable to import the immediately previous $n+2^{th}$ sample of the serial audio data. In other words, the semiconductor device ends up missing the import of the immediately previous $n+2^{th}$ sample of the serial audio data. This is known as a missed import of a sample. For this reason, a deterioration in the sound quality occurs when the LRCLK cycle is shorter than the fssync signal cycle in the same way as when the LRCLK cycle is longer.

In other words, when serial audio data input from an external source using I2S or the like, and audio data read from internal memory are mixed and reproduced, if a divergence is generated between the LRCLK cycle and the fssync signal cycle, then a deterioration in the sound quality is generated due to the duplicated imports or missed imports of the serial audio data.

For this reason, the inventors of the present application made investigations into finding a technology that is able to prevent duplicated imports or missed imports of serial audio data, and thereby achieve an improvement in sound quality even when a divergence is generated between an LRCLK cycle and an fssync signal cycle. As a result of these investigations, as is described below, the inventors of the present application were able to devise a technology that enables duplicated imports or missed imports of serial audio data to be prevented, and thereby enables an improvement in sound quality to be achieved even when a divergence is generated between an LRCLK cycle and an fssync signal cycle.

Figure 7:
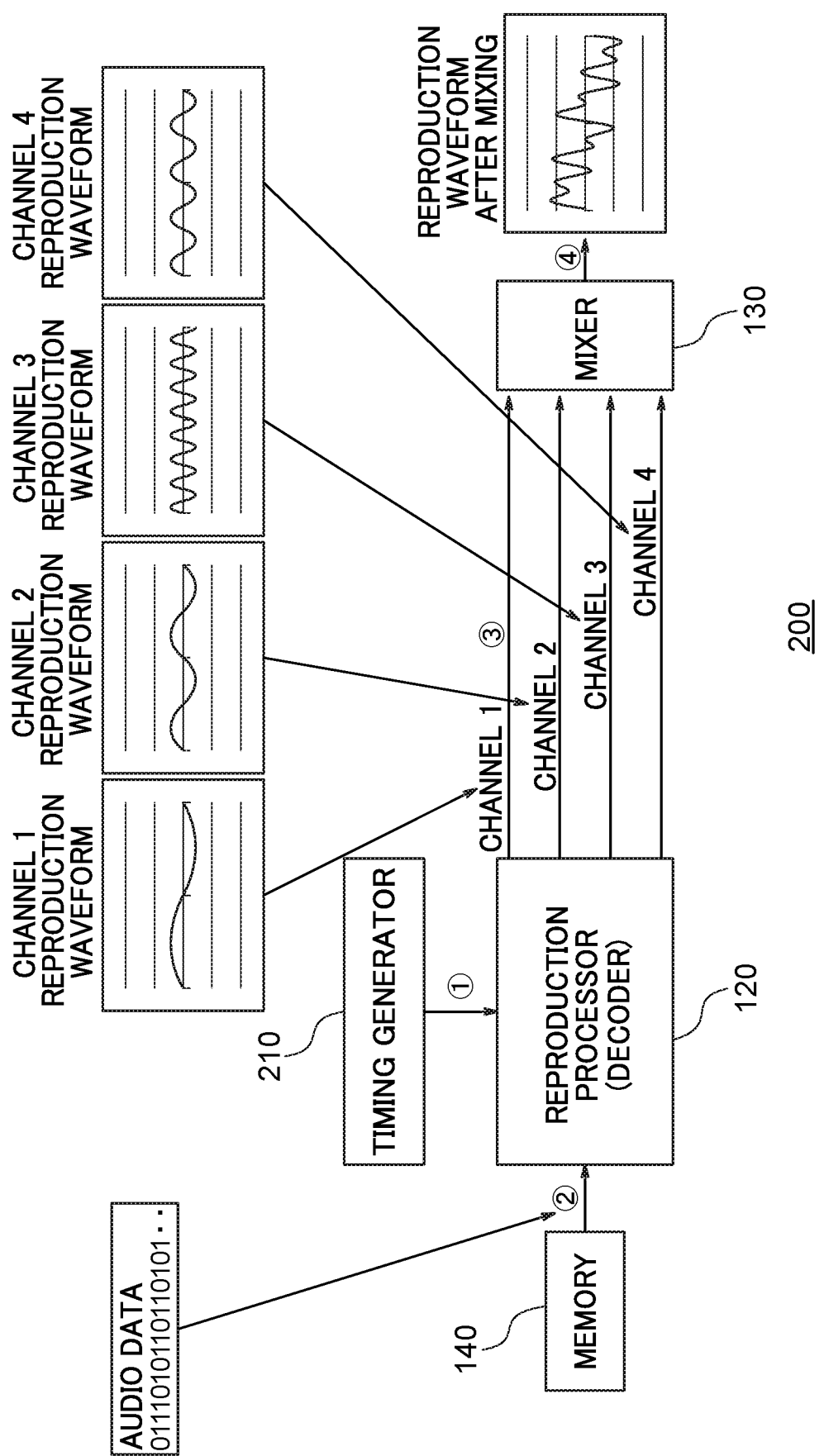
FIG. 7 is a structural block diagram of a semiconductor device 200 according to an exemplary embodiment of the present disclosure.

FIG. 7 shows an example of the structure of a semiconductor device 200 according to an exemplary embodiment of the present disclosure. The semiconductor device 200 shown in FIG. 7 outputs audio signals. As is shown in FIG. 7, the semiconductor device 200 is formed by a timing generator 210 (a timing generating circuit), a reproduction processor (decoder) 120 (a reproduction processing circuit), a mixer 130 (a mixing circuit), and memory 140.

When the semiconductor device 200 according to the present exemplary embodiment mixes serial audio data input from an external source using I2S or the like with audio data stored in the memory, a signal that is synchronized with an edge of the LRCLK of the serial audio data is used as a signal that is synchronized with the sampling cycle, and taking this signal as a trigger, the audio data stored in the memory 140 is reproduced and is mixed with this serial audio data.

The timing generator 210 generates an fssync signal using a base clock so as to match the input timings of the serial audio data that is input from an external source using I2S or the like. For example, the timing generator 210 detects an edge of the LRCLK of the serial audio data, in other words, detects a rise or a fall of the LRCLK and, in accordance with these detected timings, generates an fssync signal that the reproduction processor (decoder) 120 uses to read audio data from the memory 140.

The reproduction processor (decoder) 120 reads the audio data stored in the memory 140 at the timings of the rises in the fssync signal generated by the timing generator 210, and decodes the read audio data before outputting it to the mixer 130. In the present exemplary embodiment, the reproduction processor 120 reads and decodes the audio data of two channels from the memory 140.

The mixer 130 mixes the audio channels decoded by the reproduction processor (decoder) 120 with the serial audio data of the two left-right channels (L ch/R ch). In the present exemplary embodiment, the mixer 130 mixes two channels of audio data with two channels of serial audio data.

Figure 8:
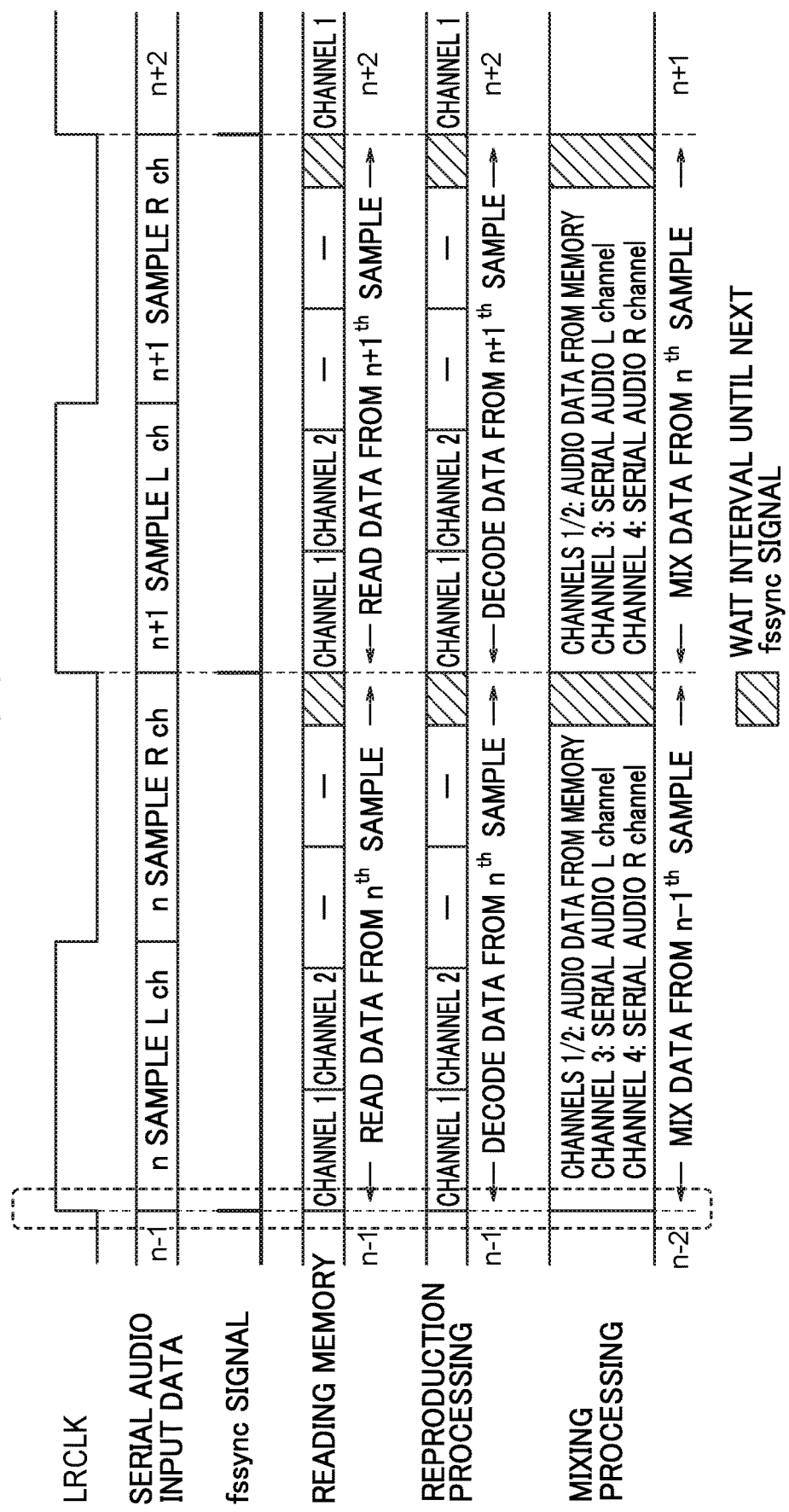
FIG. 8 is a timing chart for fssync signal generation according to an exemplary embodiment of the present disclosure.

FIG. 8 is a timing chart for generating an fssync signal according to an exemplary embodiment of the present disclosure. The semiconductor device 200 according to the present exemplary embodiment detects rises in the LRCLK, and generates an fssync signal that rises at the same timings as the rises of the LRCLK. In the example shown in FIG. 8, an fssync signal that rises at the same timings as the rises of the LRCLK is generated, however, it is also possible for the timing generator 210 to generate an fssync signal that rises at the same timings as the falls of the LRCLK.

The semiconductor device 200 reads and then decodes the audio data for two channels from the memory 140 in accordance with the rises in the fssync signal. Next, the semiconductor device 200 mixes the two channels of decoded audio data with the two channels of serial audio data.

FIG. 9 is a timing chart for the semiconductor device 200 according to an exemplary embodiment of the present disclosure. When the timing generation unit 210 detects a rise in the LRCLK, then in synchronization with the internal base clock thereof, it sets the LRCLK edge detection signal to 'H'. At the same timings as the LRCLK edge detection signal is set to 'H', the timing generator 210 clears the sampling cycle counter, and sets the fssync signal to 'H'. The internal circuits, in other words, the reproduction processor (decoder) 120 and the mixer 130 read the audio data from the memory 140 in the normal way taking the timings when the fssync signal is set to 'H' as triggers, and perform reproduction processing and mixing processing. Note that in the timing chart shown in FIG. 9, the counter match signal is fixed at 'L'.

As is described above, according to the present exemplary embodiment, as a result of rises in the LRCLK being detected, and an fssync signal being generated that rises at the same timings as the rises in the LRCLK, it is possible to synchronize the LSI with the inputs of the serial audio data. In other words, according to the present exemplary embodiment, because it is possible to synchronize the LSI with the inputs of the serial audio data, it is possible to prevent duplicated imports or missed imports of serial audio data.

In the timing chart of the semiconductor device 200 shown in FIG. 8, two channels of audio data and two channels of serial audio data are mixed, however, the present disclosure is not limited to this example. It is also possible for the serial audio data that is mixed to be one of the L ch data or the R ch data. If the serial audio data that is mixed is one of the L ch data or the R ch data, then the semiconductor device 200 mixes a maximum of three channels of audio data and one channel of serial audio data.

Moreover, in the timing chart of the semiconductor device 200 shown in FIG. 8, the audio data of channel 1 and channel 2 is read from the memory 140 and mixed with the serial audio data, however, the channels of audio data that are read from the memory 140 are not limited to channel 1 and channel 2.

Moreover, in the timing chart of the semiconductor device 200 shown in FIG. 9, the LRCLK rises are detected in each cycle of the LRCLK, and an fssync signal that rises at the same timings as the rises in the LRCLK is generated, however, the present disclosure is not limited to this example. For example, it is also possible for the timing generator 210 to hold a value of a sampling cycle counter at the timings when the rises or falls of the LRCLK are detected as a counter expiration value, and to generate an fssync signal that rises at the timings when the value of the counter matches the counter expiration value. In other words, it is also possible for the timing generator 210 to set a counter match signal to 'H' at the timings when the value of the counter matches the counter expiration value, and to generate an fssync signal that rises at the timings when the counter match signal is at 'H'. By generating an fssync signal that rises at the timings when the value of the sampling cycle counter matches the counter expiration value, it becomes unnecessary for the semiconductor device 200 to detect the rises of the LRCLK in each cycle.

Note that when the timing generator 210 holds a value of a sampling cycle counter at the timings when the rises or falls of the LRCLK are detected as a counter expiration value, then this counter expiration value may be updated at a predetermined cycle. For example, it is also possible for the timing generator 210 to detect the LRCLK rises once every ten LRCLK cycles, and to then update the counter expiration value. As a result of the semiconductor device 200 cyclically detecting the LRCLK rises and then updating the counter expiration value, it becomes possible to mix the audio data and the serial audio data more accurately.

If the sampling cycle of the LRCLK is shorter than the sampling cycle of the internal base clock of the semiconductor device 200, then it is also possible for the semiconductor device 200 to be provided with a circuit structure that enables it to complete the reading from memory, the reproduction processing, and the mixing processing sufficiently earlier than the divergence of the LRCLK in order that the audio processing of the memory and the mixing processing can be completed. More specifically, if the sampling cycle of the LRCLK is faster than the sampling cycle of the internal base clock, then by providing a sufficient wait interval before the next fssync signal, the cycle of the LRCLK can be prescribed as the LSI so that the processing is completed on time.

If the sampling cycle of the LRCLK is longer than the sampling cycle of the internal base clock of the semiconductor device 200, then because the semiconductor device 200 starts the wait interval at the point when the internal processing thereof has been completed, and starts the processing of the next sample at the input timing of the next serial audio, no particular problem occurs.

In this way, by forming the semiconductor device 200 according to the present exemplary embodiment such that this semiconductor device 200 starts its internal processing each time the LRCLK rises, even if a divergence arises between the LRCLK cycle and the cycle of the fssync signal, it is possible to obtain synchronization with an asynchronous serial audio input.

Note that the present disclosure may also be applied to the mixing between a device having a function of reproducing audio in synchronization with a sampling cycle such as a sound source or a sound generator, and an input of serial audio data using an I2S or the like.

An exemplary embodiment of the present disclosure has been described above, however, the present disclosure is not limited to this. Various modifications and the like may be made to the present disclosure insofar as they do not depart from the spirit or scope of the present disclosure.

What is claimed is:
1. A semiconductor device comprising:
   a timing generator that generates synchronization signals so as to match input timings of serial audio data received from an external source;
   a reproduction processor that, based on the synchronization signals, reads audio data from memory, performs reproduction processing, and outputs a plurality of channel information items; and a mixer that mixes the plurality of channel information items with the serial audio data, and reproduces an audio signal, wherein the timing generator detects rises or falls of a channel switching clock in the serial audio data, and at timings when the rises or falls of the channel switching clock in the serial audio data are detected, the timing generator holds a value of a counter whose value is increased by a base clock as a counter expiration value, and generates the synchronization signals at timings when the value of the counter matches the counter expiration value.

2. The semiconductor device according to claim 1, wherein the timing generator updates the counter expiration value at a predetermined cycle.

3. The semiconductor device according to claim 1, further comprising the memory from which the reproduction processor reads the audio data.

4. The semiconductor device according to claim 1, wherein the memory from which the reproduction processor reads the audio data is external to the semiconductor device.

5. The semiconductor device according to claim 1, wherein the external source is an I2S (Inter-IC Sound) bus.

* * * * *